Feb. 25, 1947.　　　T. BROWN　　　2,416,373
JOINT OR SEPARATE OPERATION OF CONTROL
VALVES FOR TWO FLUID MOTORS
Filed Feb. 1, 1943　　　5 Sheets-Sheet 2

INVENTOR.
THEOPHILUS BROWN
ATTORNEYS

Feb. 25, 1947. T. BROWN 2,416,373
JOINT OR SEPARATE OPERATION OF CONTROL
VALVES FOR TWO FLUID MOTORS
Filed Feb. 1, 1943 5 Sheets-Sheet 4
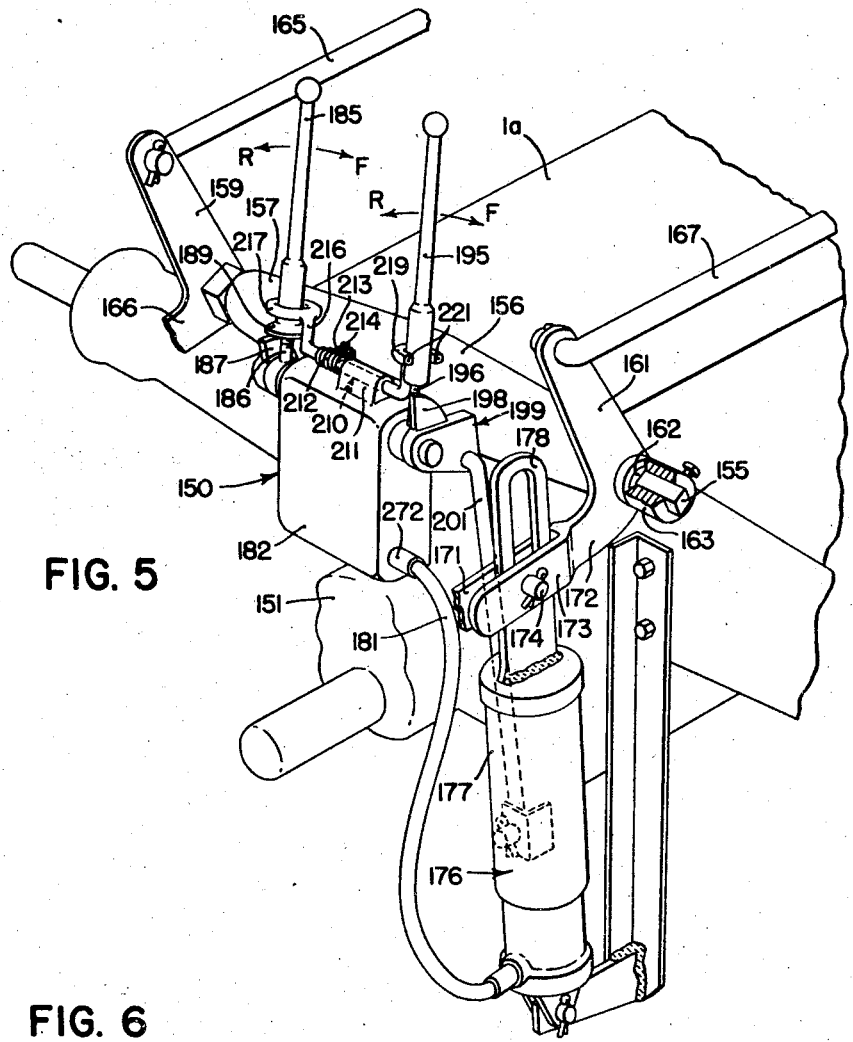
FIG. 5
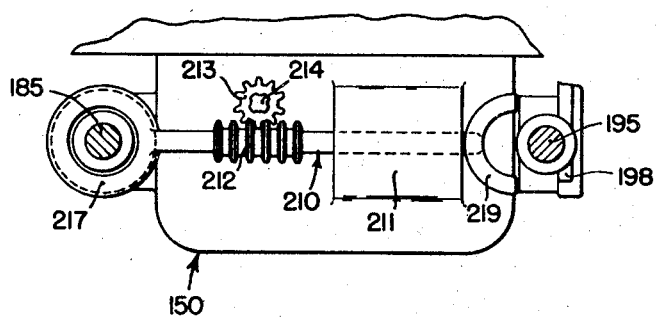
FIG. 6
*INVENTOR.*
THEOPHILUS BROWN
*ATTORNEYS*

Patented Feb. 25, 1947

2,416,373

UNITED STATES PATENT OFFICE 2,416,373

JOINT OR SEPARATE OPERATION OF CONTROL VALVES FOR TWO FLUID MOTORS

Theophilus Brown, Moline, Ill., assignor to Deere & Company, Moline, Ill., a corporation of Illinois Application February 1, 1943, Serial No. 474,404

7 Claims. (Cl. 60—97)

The present invention relates generally to power lift mechanism for agricultural tractors and the like, and more particularly to hydraulic mechanism including two separately operable ram units. The object and general nature of the present invention is the provision of hydraulic mechanism including a pair of ram units with control means therefor so constructed and arranged that the ram units may be simultaneously operated and controlled or operated and controlled separately or individually. A further feature of this invention is the provision of a pair of ram units each having means for returning the controlling valve to a neutral position after a given amount of extension of the ram unit, with a single control member shiftable from an intermediate position in which both ram units are controlled into either of two other positions for operating the ram units separately or individually, as desired. Specifically, it is a feature of this invention to provide suitable control means associated with each ram unit and adapted, when the single control member is in a central position, to act through said member to return both valves to a neutral position, or to return only the valve of the ram unit being operated to neutral position automatically, the same adjustment being employed, whether both of the ram units are controlled together or separately. A further feature of this invention is the provision of hydraulic mechanism including a pair of ram units, each having its own individual control, with means shiftable from one position, in which both controls are operated together, into another position in which the controls may be operated individually. More specifically, it is a feature of this invention to provide a hydraulic arrangement of this kind in connection with a single source of power, such as a positive displacement pump, with a bleeder valve arranged in the system for diverting a quantity of fluid when only one ram unit is extended, the bleeder valve being adapted to be automatically closed when both ram units are operated together, whereby the time of operation, whether both units together, or only one, is the same in both cases or substantially so.

These and other objects and advantages of the present invention will be apparent to those skilled in the art after a consideration of the following detailed description, taken in conjunction with the accompanying drawings, in which Figure 1 is a plan view of an agricultural tractor equipped with hydraulic apparatus of the present invention;

Figure 5 is a modified form of the present invention in which two ram units are associated with a single source of fluid pressure such as a pump, with optionally controlled means for operating the two ram units either separately or simultaneously;

Figure 6 is a fragmentary top view of the shiftable valve control handle; and

Figure 1:
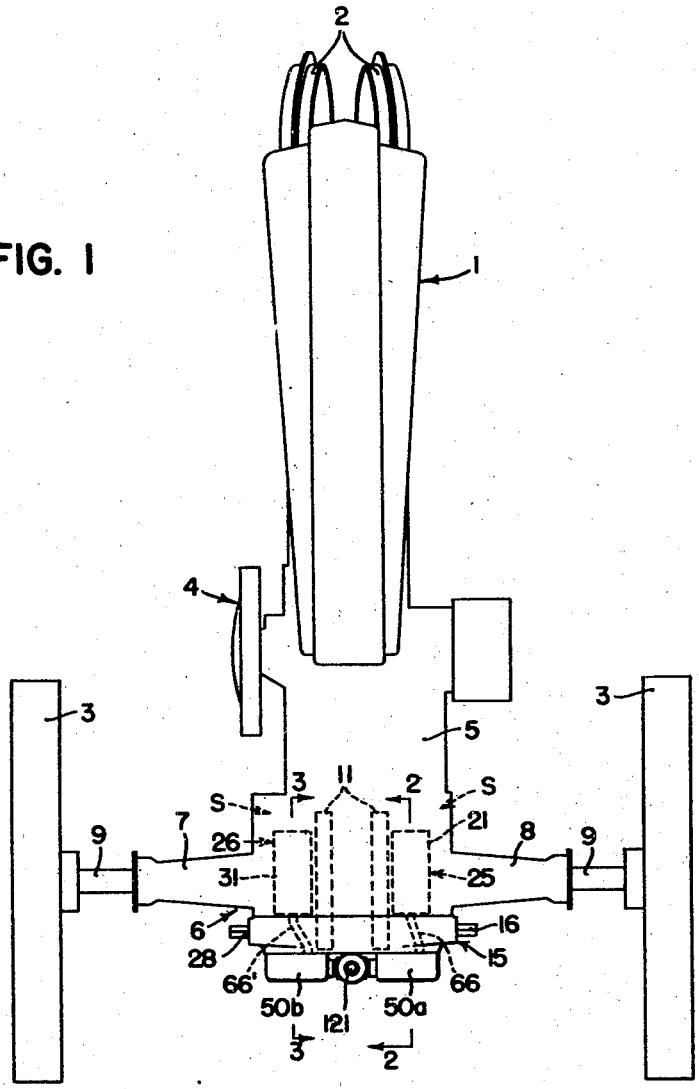

Referring now to the drawings, particularly Figure 1, the reference numeral 1 indicates a farm tractor which is supported on front wheels 2 and rear traction wheels 3 and which comprises a motor 4 and a combined crank case and supporting structure, indicated generally at 5, to which a rear axle housing 6 is bolted. The rear axle housing 6 includes laterally directed housing sections 7 and 8 in which drive axles 9 are journaled. The wheels 3 are mounted on the laterally outer ends of the axles 9. Secured to the laterally inner end of each of the axle shafts 9 is a drive gear 11 arranged in the tractor to be driven by transmission mechanism (not shown) that in turn is driven by the tractor motor 4. The rear portion of the combined crank case and supporting structure 5 and the adjacent portions of the rear axle housing 6 are so constructed that there is a space s between each gear 11 and the side of the associated housings.

Figure 2:
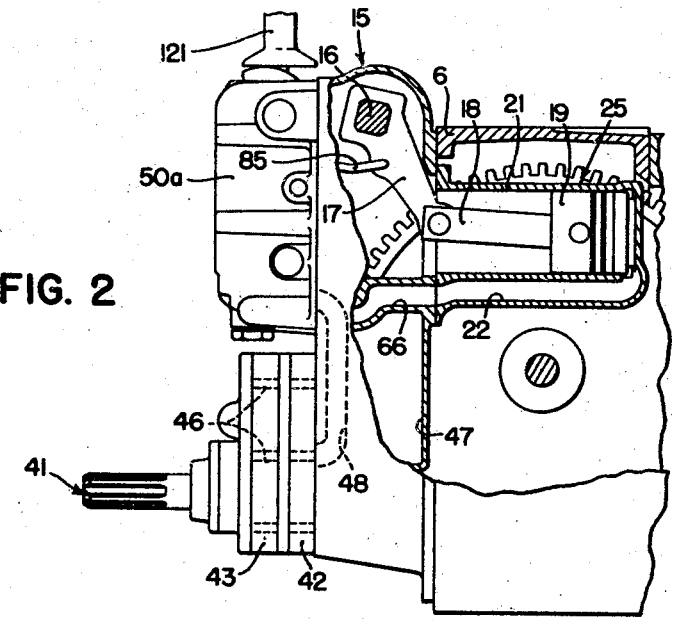
Figure 2 is a fragmentary section taken generally along the line 2—2 of Figure 1, showing one of the piston and cylinder or ram units and the associated gear pump.

As best shown in Figure 2, a power lift housing, indicated in its entirety by the reference numeral 15, is bolted to the rear face of the rear axle housing 6, and a lifting rockshaft 16 is mounted in the right portion of the housing 15. An arm 17 is fixed to the rockshaft 16 and is connected by a link 18 to a piston 19 that is mounted within a cylinder 21 that is bolted to the front side of the housing 15, generally at the right side of the tractor, as shown in Figure 1. Fluid under pressure is directed into the cylinder 21 ahead of the piston 19 through a conduit or passageway 22. The piston and cylinder 19, 21 and associated parts constitute a working ram unit, indicated in its entirety by the reference numeral 25, which is connected to rock the shaft 16 for the purpose of raising or lifting implement parts for performing other functions, as desired.

Figure 3:
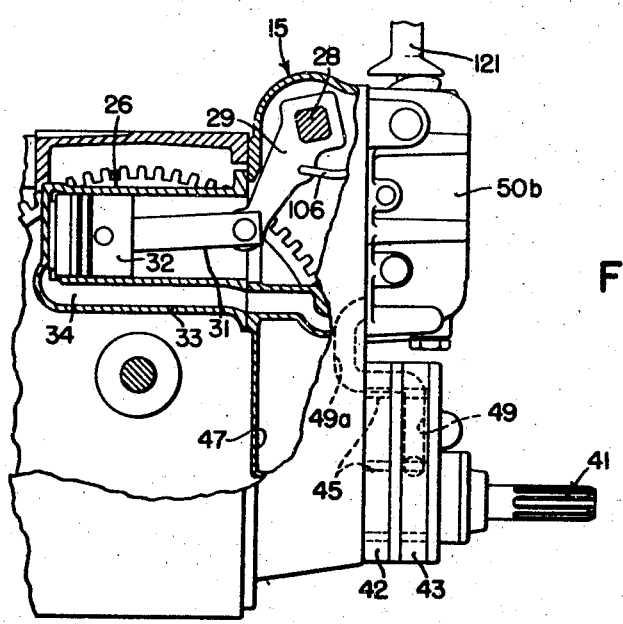
Figure 3 is a section taken generally along the line 3—3 of Figure 1 and showing the other piston and cylinder or ram unit and its associated pump.

A second piston and cylinder or ram unit 26 is disposed at the other side of the tractor, as best shown in Figures 1 and 3. A lifting rockshaft 28 is mounted in the left portion of the power lift housing 15, generally in axial alignment with the rockshaft 16. An arm 29 is secured to the lifting rockshaft 28 and is connected by a link or piston rod 31 to a piston 32 disposed in a cylinder 33 that is bolted to the front side of the power lift housing 15, generally at the left side of the tractor, as shown in Figure 1, the piston 32 and cylinder 33 constituting parts of the ram unit 26 above referred to. A passageway 34 directs fluid under pressure into the cylinder 33 ahead of the piston 32.

According to the principles of the present invention, each of the ram units 25 and 26 is provided with its own source of pressure, such as a gear pump of the positive displacement type. Generally, the gear pumps are similar to the type of pump shown in the United States Patent No. 2,107,760, issued February 8, 1938, to E. McCormick et al., to which reference may be had if desired. In the McCormick et al. patent only one pump is shown, but, according to the present invention, two pumps are employed, both driven from the same shaft, as will now be described. The power take-off shaft of the tractor is indicated by the reference numeral 41 and is connected with the tractor motor 4 through suitable gearing (not shown). Normally, the tractor motor is operated at a substantially constant speed by suitable governor mechanism and therefore the pump or pumps driven from the power take-off shaft 41 are also operated at constant speed, and being positive displacement devices such pumps form a source of fluid under pressure delivered at substantially constant volume and pressure per unit time.

Referring now to Figure 2, the power take-off shaft 41 is somewhat longer than the corresponding part in the power lift mechanism shown in the above-mentioned E. McCormick et al. patent. Secured to the rear side of the power lift housing 15 is a pair of substantially identical pump casings 42 and 43, each enclosing a pair of pump gears, there being one gear of each pair splined onto or otherwise connected to be rotated by the power take-off shaft 41. The pump gears in the casing 42 are indicated at 45 in Figure 3 and the gears in the casing 43 are indicated in Figure 2 by the reference numeral 46. Each pair of pump gears communicates with a sump 47 formed in the lower part of the power lift housing 15, substantially in the same manner as illustrated in the E. McCormick et al. patent, and a high pressure passage 48 is formed in the pump casing 42 and in the adjacent portions of the power lift housing 15. The upper end of the high pressure passage 48 communicates with a valve box 50a (Figure 4), and a similar high pressure passage 49 (Figure 3) extends from the high pressure side of the pump gears 46 upwardly through the casing 43, through a portion of the casing 42 and into cooperating passages 49a in the power lift housing 15 leading to a second valve box 50b (Figure 4).

The present invention is not particularly concerned with the details of the valve boxes 50a and 50b, these units being substantially like the controlling valve mechanism shown in United States Patent 2,403,422, issued July 2, 1946, to Wayne H. Worthington, except that in the present instance each valve box 50a and 50b contains only one controlling valve, rather than a pair of controlling valves as in the Worthington patent. Since, as mentioned above, the present invention is not especially concerned with the particular details of the valves or their operating means, only a brief description will be necessary.

Figure 4:
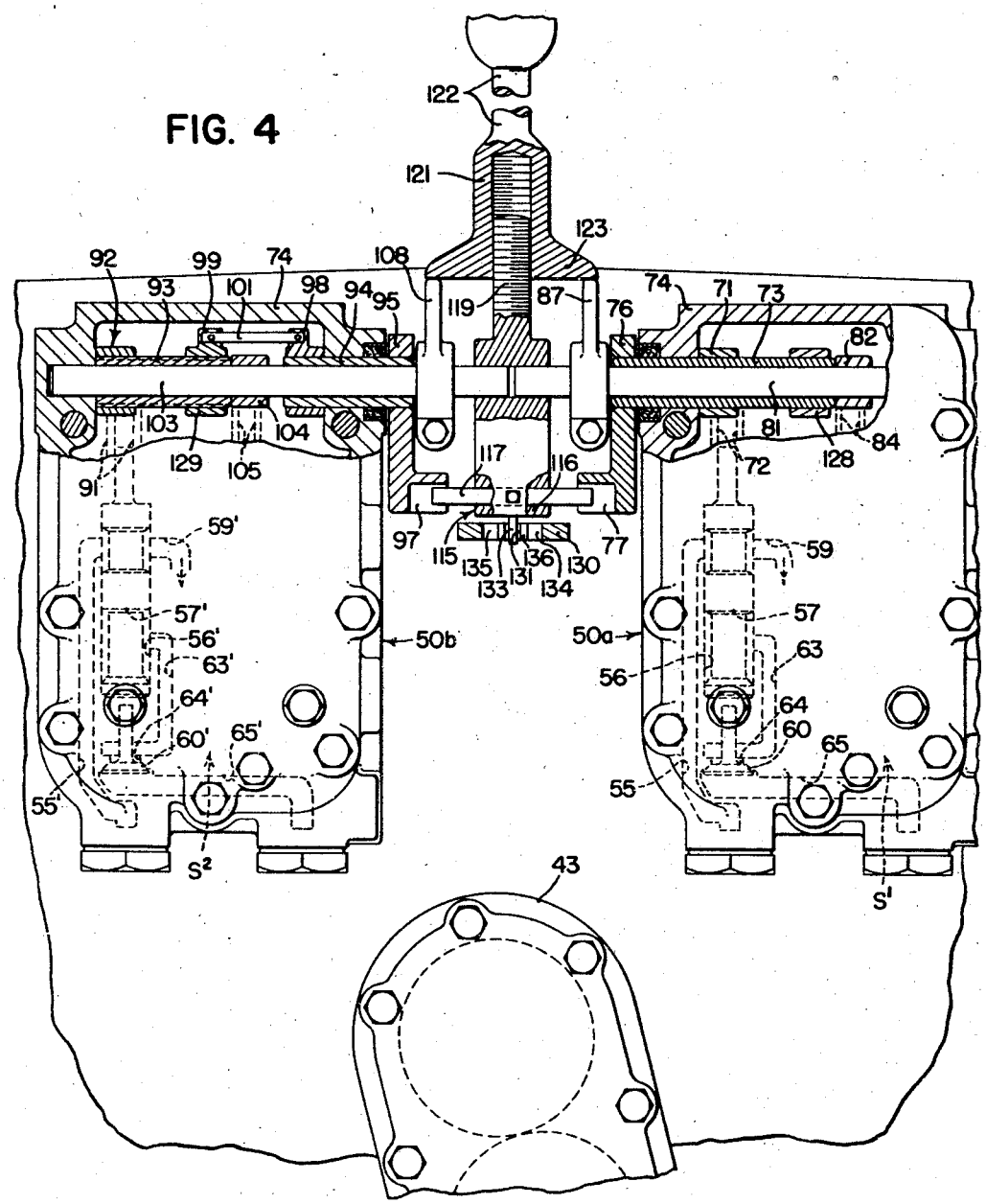
Figure 4 is an enlarged rear view, certain parts being shown in section, showing the two control valve boxes and the associated shiftable valve control lever associated therewith.

Referring now more particularly to Figure 4, in which the valve mechanisms are illustrated diagrammatically, the high pressure passage 48 leading from the pump gears 45 communicates at its upper end with a passage 55 that leads upwardly and at its upper end communicates with a valve bore 56 formed in the casing of the valve box 50a. A valve 57 is movable vertically within the valve bore 56 and controls the flow of fluid under pressure from the high pressure passage 55 outwardly through a discharge passage 59 into a sump $s^1$ formed in the valve box 50a and which communicates with and forms a part of the main sump 47 (Figures 2 and 3). A U-shaped passage 63 extends from the lower end of the valve bore 56 downwardly past a valve controlled port 64 and into a passage 65, all formed in the casing of the valve box 50a. The passage 65 opens at its forward end into communication with a passage 66 (Figure 1) formed in the body of the housing 15 (Figure 2) and communicating with the passage 22 that leads to the cylinder 21.

The valve box 50b and associated passages and valve mechanism is substantially the same as the valve box 50a just described. It will be sufficient to note that the high pressure passage 49 (Figure 3) from the pump gears 46 leads through a conduit 49a into a high pressure passage 55', outward flow of fluid therefrom through a discharge passage 59' to the sump $s^2$ of the valve box 50b being controlled by a valve 57' operating in a valve bore 56'. A high pressure passage 63' leads from the lower end of the valve bore 56' through a valve controlled port 64' and into a high pressure passage 65'. The latter passage communicates with a passage 66' (Figures 1 and 3) which conducts the fluid under pressure into the passage 34 that leads to the cylinder 31.

In the operation of both of the valves 57 and 57', upward movement of the valve closes off the flow through the discharge passage, 59 or 59', and fluid is caused to flow under pressure from the pump through the passages 55 or 55', 63 or 63', past the associated check valve and into the high pressure passage 65 or 65' leading to the associated ram unit 25 or 26. Moving the valves downwardly from their neutral position, as shown, serves to open the associated check valves and permits oil or other fluid under pressure to flow from the respective ram units back into the sump 47. By virtue of this construction, moving either of the valves 57 or 57' from its neutral position serves to cause the rockshaft associated therewith, 16 or 28 (Figures 2 and 3), to move in one direction or the other. Usually, the agricultural implement tools normally associated with the rockshafts are so connected that they tend to move the rockshafts in one direction, such as the lowering direction, while the hydraulic pressure acting against the rockshafts through the above described pump units and ram units serve to cause the rockshafts to rock in the other direction, under the control of the associated valve mechanism.

Coming now to the valve controlling structure with which the present invention is more particularly concerned, it will be seen from Figure 4 that the valve 57 of the valve box 50a is connected to be raised and lowered by an arm 71 connected to the valve 57 by link means 72 and fixed to a tubular shaft 73 disposed within the casing 74 of the valve box 50a. The tubular shaft 73 extends outwardly of the housing 74 at the inner side thereof and has secured thereto, as by welding or the like, an arm 76 which at its lower end has a socket 77. Movement of the arm 76 in one direction or the other from a neutral position therefore moves the valve 57 upwardly or downwardly from its neutral position, as shown. A second shaft 81 is disposed within the tubular shaft 73 and at its inner end has an arm 82 fixed thereto which, through suitable linkage, is connected to be moved proportional to the movement of the rockshaft 16. One arm of the continuous control linkage just mentioned is shown in Figure 4 by the reference numeral 84 and the link that controls the part 84 and is connected with the arm 17 on the rockshaft 16 is indicated in Figure 2 by the reference numeral 85. This linkage is similar to the corresponding linkage shown in the above-mentioned Worthington patent. The inner shaft 81 extends outwardly of the casing 74 beyond the end of the tubular shaft 73 and has a cam member 87 fixed thereto in any suitable manner.

Again referring to Figure 4, the other valve box 50b has operating mechanism for the valve 57' which is substantially the same as that just described. The upper end of the valve 57' is connected by a link 91 to an arm 92 that is fixed to a tubular shaft 93. The latter shaft is spaced axially from a second tubular shaft 94 that extends outwardly of the casing 74' of the valve box 50b at the laterally inner side thereof, and the outwardly extended end of the tubular shaft section 94 is provided with an arm 95 which is preferably identical with the arm 76, having a lower socket 97, as shown. The two tubular shaft sections 93 and 94 are connected to be rocked together by arms 98 and 99, connected together by a rod 101. The tubular shafts 93 and 94 are mounted on a shaft 103 that extends from one side to the other of the casing 74' and at one point is provided with a continuous control linkage arm 104 which functions substantially in the same way as the arm 82 in the valve box 50a, the arm 104 being connected by suitable linkage 105 and 106 (Figure 4 and Figure 3) with the arm 29 that is fixed to the rockshaft 48 (Figure 3). A cam 108, similar to the cam 87, is fixed to the end of the shaft 103 that extends outwardly of the casing 74' laterally inwardly in axial alignment with the corresponding shaft 81 of the valve box 50a.

One of the principal features of the present invention is the provision of a control whereby the two ram units 25 and 26 may both be operated at the same time, or either may be operated independently of the other, with one adjustment, effective for both ram units, for automatically determining or adjusting the point at which either or both of the rockshafts 16 and 28 will be hydraulically locked against further movement, thereby adjusting or determining an operating position for the tool or tools associated with the rockshafts 16 and 28. To this end, a valve actuating member 115 is mounted for rocking movement on the adjacent ends of the shafts 81 and 103 and is also capable of lateral sliding movement in either direction from a neutral position, as will be clear from Figure 4. The member 115 is extended downwardly, as at 116, and is provided with a cross bore carrying a transverse pin 117, the ends of which, when the member 115 is in a neutral position, as shown in Figure 4, lie in the sockets 77 and 97, whereby rocking movement of the member 115 in one direction or the other, in a plane perpendicular to the plane of the paper in Figure 4, serves to rock both of the arms 76 and 95 in one direction or the other, thereby operating both valves 57 and 57'. The upper end of the member 115 is threaded, as at 119, and receives the threaded section 121 of a valve control handle 122. The lower end of the threaded section 121 is extended laterally to form a flange 123 that overlies both cam members 87 and 108 when the member 115 is in a neutral position, as shown in Figure 4. When the member 115, 122 is shifted, say to the right as viewed in Figure 4, rocking movement of the valve handle 122 therefore serves to actuate only the valve 57, and similarly, when the member 115, 122 is moved to the left, as viewed in Figure 4, only the valve 57' will be controlled. Specifically, in the first instance where the member 115, 122 is shifted to the right, the pin 117 is disengaged from the socket 97 and the flange 123 is moved out of the path of movement of the cam member 108, and when the valve member 115, 122 is moved to the left, the flange 123 and the pin 117 move out of connection with the cam 87 and the socket 77.

In operation, assuming first that the member 115, 122 is in a neutral position, controlling both valves 57 and 57', when the valve handle 122 is moved forwardly, the pin 117 acts to swing both of the arms 76 and 95 in a direction to raise both valves 57 and 57'. This causes fluid from the two pumps to be directed into the two ram units 25 and 26, causing both pistons 19 and 32 to be moved rearwardly, thereby rocking both rockshafts 16 and 28 in what may be termed their raising direction. The operator may at any time terminate the movement of the rockshafts 16 and 28 in their raising direction by returning the valve handle 122 to its neutral position. If he fails to do this, suitable end return linkage is provided for automatically returning the valves 57 and 57', and the associated member 115, to a neutral position. Such end return linkage, preferably similar to that shown in the Worthington patent, includes a part adapted to be engaged by the rear end of the connecting rod of each ram unit, such member being suitably connected by an arm to the associated tubular shaft, 73 or 93, such arm being indicated in Figure 4 by the reference numerals 128 and 129, respectively, the arm 99 forming a part of the arm 129 in the valve box 50b.

When the tools or other implement units connected with the rockshafts 16 and 28 are in their raised or corresponding position, they may be moved out of that position by moving the valve handle 122 rearwardly, the latter still occupying its central or intermediate position, as shown in Figure 4. The rearward movement of the valve handle 122 acts through the cross pin 117 to rock both shafts 73 and 93 in a direction to move the associated valves 57 and 57' downwardly. At their lower ends, these valves engage the stems of the associated check valves, opening the high pressure passages 65 and 65' and permitting fluid to flow from the respective ram units back to the sump 47. As the fluid is thus exhausted from the cylinders 21 and 31, the pistons therein move forwardly, accommodating the corresponding rocking movement of the rockshafts 16 and 28. As these parts rock in what may be termed their lowering direction, the continuous control shafts 81 and 103 are also rocked in a corresponding direction an amount through the associated continuous control linkage 84, 85 and 105, 106. This movement of the shafts 81 and 103 swings the cams 87 and 108 forwardly, eventually engaging the flange 123 on the valve handle 122. A slight additional movement then serves to automatically return the handle 122 to a neutral position, thereby restoring the valves 57 and 57' to their intermediate position and locking a certain amount of fluid in each ram unit. The point at which this movement of the continuous control linkage and associated shafts 81 and 103 returns the valve handle 122 to its neutral position may be adjusted by turning the sleeve section 121 upwardly or downwardly on the threaded section 119.

The above described action takes place in substantially the same way when the valve control lever 122 is shifted into either a left hand or a right hand position, except that in that event only one or the other of the valves, and hence only one or the other of the associated ram units, is controlled. For insuring a positive and definite movement of the valve controlling lever 122, either in its neutral position or in either of its two shifted positions, I provide a gate member 130 secured to either or both of the valve boxes 50a and 50b and having a first slot 131 defining the neutral position of the handle 122, by virtue of a small lug or extension 133 carried on the member 115 and lying in the slot 131. Right and left hand slots 134 and 135 are also provided in the gate 130 to receive the lug 133 when the lever 121 is in or the other of its shifted positions, and movement of the lever from one position to the other is accommodated by a transverse slot 136.

A modified form of the invention is shown in Figures 5 et seq. Referring first to Figure 5, this form of the invention includes a main hydraulic power lift unit 150 adapted to operate a pair of implement controlling members suitably connected with a tool or tools, such as cultivators or the like, whereby the tool or tools may be raised or lowered simultaneously or independently. This mechanism is similar to the mechanism shown in my prior U. S. Patent 2,337,638, issued December 28, 1943. In this form of the invention the hydraulic unit 150 is substantially identical with the hydraulic unit disclosed and claimed in the above-mentioned Worthington patent. It will therefore be unnecessary to completely describe the unit 150 except to say that a gear pump 151 serves as a source of fluid under pressure for delivering oil under control of suitable valve mechanism to a cylinder and piston or ram unit arranged similar to the power lift mechanism shown in the prior United States patent to E. McCormick et al., No. 2,107,760, dated February 8, 1938, to which reference may be made if necessary. The piston of such a unit is connected through an arm to a transverse rockshaft 155 that is mounted for rocking movement in a housing 156 having lateral extensions 157, there being only a single rockshaft in this form of the invention. Preferably, the rockshaft 155 is square in cross section but it may be formed otherwise, if desired. At the left side of the tractor, indicated by the reference numeral 1a, an arm 159 is fixed by any suitable means to the left end of the rockshaft 155, and at the other end of the latter, a bell crank 161 is mounted for rocking movement, preferably on a journal or bushing 162 which provides for movement of the bell crank 161 relative to the rockshaft 155. The bell crank 161 is held in position between the outer end of the right lateral extension 157 and a collar 163 fixed to the rockshaft 155. Connected to the left arm 159 is a cultivator lift pipe 165, and the arm 159 may have a rearward extension 166 to which rear rigs may be connected. The bell crank 161 at the other side of the tractor is also connected to a cultivator push pipe 167, and likewise the bell crank 161 is provided with a rearward extension 171 to which other rear rigs may be connected if desired, the extension 171 forming a part of the rearwardly extending arm 172 that includes a bifurcated portion 173 which is apertured to receive a pivot pin 174. An auxiliary ram unit 176 is anchored at its lower end to a bracket connected to or carried by the tractor 1a, and the movable piston unit 177 of the ram unit 176, is connected by a link or strut 178 to the pivot 174. Fluid flows to the ram unit 176 through a flexible hose connection 181, connected into the valve box 182 that forms a part of the hydraulic unit 150.

The valve mechanism enclosed in the casing 182 and the operating and controlling means therefor is, in this form of the invention, quite similar to the valve means shown in Figure 4 and described above and the valve mechanism shown in the above-mentioned Worthington patent. It is therefore sufficient to note that, in this form of the invention, the hydraulic unit 150 incorporates means that causes fluid to be directed under pressure into the cylinder in which the piston controlling the rockshaft 155 is movable, such valve mechanism also incorporating similar means controlling the flow of fluid to and from the auxiliary ram unit 176. As best shown in Figure 5, the first mentioned control means includes a hand lever 185 having its lower section in screw-threaded engagement with the upper end of an arm 186 that is connected directly to and forms a part of the valve mechanism controlling the ram unit that rocks the rockshaft 155. A return cam 187 is fixed to a shaft carried by the casing 182 and is operatively connected with the piston associated with the rockshaft 155 so as to be moved in a forward direction so as to engage a flange 189 formed on the hand lever 185 and return the latter to a neutral position when the piston reaches a given point in its forward movement, depending upon the adjustment of the member 185 on the member 186. The hand lever for controlling the auxiliary ram unit 176 is indicated in Figure 5 by the reference numeral 195 and includes a lower section that is threaded onto an arm 196 that is connected directly with the valve mechanism controlling the flow of fluid to and from the ram 176. A return cam 198 is formed on a rockable member 199 that is connected by a link 201 with the piston section 178 of the ram 176, whereby when the valve is in a position permitting fluid to flow from the ram back to the sump, the resulting movement of the piston section causes the member 199 to rock in a direction to carry the cam 198 into engagement with the lower end of the hand lever 195 and to return the latter to a neutral position at a point in the cycle of operation which depends upon the position of adjustment of the member 195 on the threaded arm 196. The particular valve mechanism incorporated in the hydraulic unit 150 is shown diagrammatically in Figure 7 and will be referred to in detail below. It will be understood that the particular details of the valve mechanism do not per se form a part of the present invention except in combination with other novel features.

The valve operating handle 185 and the member 186 on which it is mounted are disposed for lateral movement toward and away from the casing 182 while maintaining operative connection with the valve mechanism in the casing 182, and the flange 189 is of sufficient radial extent so that in any position of the member 185, 186 the cam 187 is adapted to engage the flange 189 and restore the valve handle 185 to its neutral position, as described above. A connecting member, indicated in its entirety by the reference numeral 210, is mounted for sliding and rocking movement on the casing 182, the latter having one or more apertured lugs in which the central part of the member 210 is preferably disposed. The left end of the member 210 has a grooved section 212 which meshes with a pinion 213 disposed on the upper end of a bleeder valve shaft 214, there preferably being a splined or similar connection between the pinion 213 and the valve stem 214 for a reason which will appear below. At the left of the grooved section 212 the member 210 carries an arched portion 216 which terminates in a loop 217 disposed about the lower portion of the valve handle 185 in a fairly snug fitting relation but with sufficient looseness that the rocking movement of the valve handle 185 in a fore and aft direction causes the member 210 to rock about its axis of support in the lug 211. At the other end of the member 210 a forked section 219 is disposed and has arms 221 adapted to embrace the other valve operating handle 195. The member 210 is mounted for sliding movement in a lateral direction from a position in which the arms 221 clear the valve handle 195 into a position in which the latter valve is operated whenever the member 210 is rocked about its axis of support on the casing 182. The member 210 is shifted laterally by the lateral shifting movement of the valve operating member 185, 186, and whenever the member 210 is shifted the pinion 213 and the valve stem 214 is rotated, and this action is utilized according to the present invention to secure a readjustment of the hydraulic system to provide for operating the two ram units over their full stroke in substantially the same time that either may be operated singly.

Figure 7:
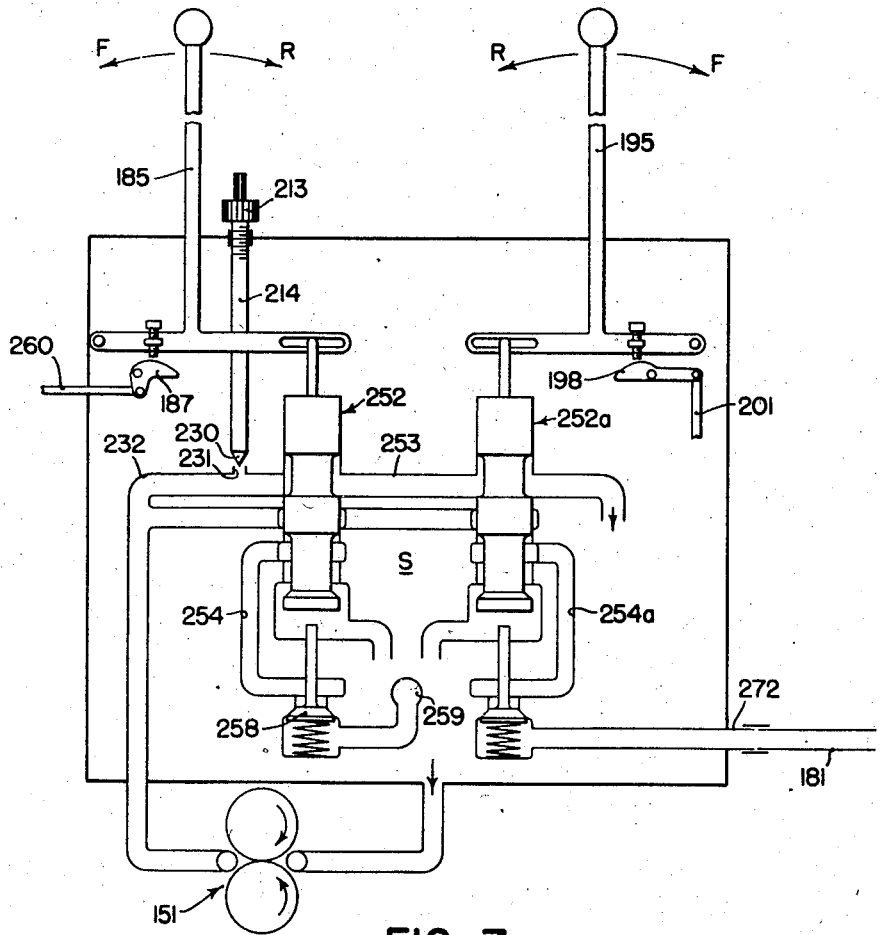
Figure 7 is a diagrammatic view of the valve mechanism.

The valve mechanism incorporated in the unit 150 is shown diagrammatically in Figure 7 and, as mentioned above, is of substantially the same construction as is shown and claimed in the Worthington patent, identified above. Referring now to Figure 7, rocking the handle 185 in the direction indicated F in Figure 5 (forward), raises a valve 252 and closes off an idle passage 253 leading to a sump S and diverts oil under pressure through a passage 254 past a check valve 258 and out into a passage 259 to the ram unit that rocks the rockshaft 155. Rocking the handle 185 in the other direction R (rearwardly) causes the lower end of the valve 252 to open the check valve 258, permitting oil to flow out of the ram unit associated with the rockshaft 155 through passages 259 and 254 back to the sump S.

When the valve lever 185 is swung in direction R to lower the valve 252 and fluid flows from the ram unit through passages 259 and 254 to the sump S, the resulting movement of the piston of the ram unit permits the rockshaft 155 to rock in a direction to swing the arm 159 rearwardly, thus lowering the tools associated therewith. A link 260 is connected to be shifted whenever the rockshaft 155 rocks in a rearward direction and this, in turn, rocks the return cam member 187 (Figures 5 and 7) which, as described above, engages the flange 189 and returns the valve handle 185, and the associated valve mechanism, to a neutral or intermediate position. The parts are so arranged that when the rockshaft 155 reaches a given point in the lowering direction, depending on the adjustment of the handle 185 on the arm 186, the cam member 187 acts against the flange 189 and the arm 186 and raises the valve 252 to its neutral position, thus automatically terminating the lowering movement of the rockshaft 155 and associated tools.

The other valve 252a is controlled by the valve handle 195 and the associated arm 196 and, in general, operates in the same way as described above in connection with the valve 252, namely, either to direct fluid under pressure through passages 254a and 272 to the flexible hose 181 leading to the auxiliary ram unit 176, or to permit fluid to flow from the latter unit back to the sump S. Acting through the link 201, when the valve 252a is lowered to permit fluid to flow from the ram unit 176, the resulting movement of the piston element 178 and the link 201 causes the cam 198 to approach the lower end of the valve handle 195, thus serving to automatically return the valve 252a to a neutral position whenever the piston of the ram unit 176 moves to a predetermined position, depending upon the adjustment of the member 195 on the member 196.

It was described above how the left valve operating handle 185 may be shifted laterally into a position to disengage the section 219 of the laterally shiftable member 210 from the valve operating handle 195. In this position of the parts, either of the valves 252 and 252a may be operated separately, as may be desired. For example, where right and left hand cultivator rigs are connected with the arms 159 and 161, the outfit may be employed for cultivating point rows, one valve operating handle being used to raise the tools at one side while permitting the outfit to travel a further distance before operating the other valve handle to raise the tools at the other side.

It may also be desirable to raise and lower the tools at the same time, and according to the present invention this may be done easily and conveniently merely by shifting the valve handle 185 to the right, which acts through the shiftable member 210 to move the section 219 into engagement with the other valve handle 195. Then by rocking either valve handle 185 or 195 forwardly, both valves 252 and 252a will be placed in a position to raise the tools at both sides of the tractor at the same time, and swinging either valve handle 185 or 195 rearwardly will therefore actuate both valves to lower both sets of tools.

Where the tractor is equipped with hydraulic power lift mechanism of the type described above, namely, one or more ram units with a pump of the positive displacement type driven at more or less a constant speed, the simultaneous connection of both ram units to the single source of power would result in operation at approximately twice the time that would occur when either of the ram units is operated independently, for the reason that the simultaneous operation of both units require twice as much oil as the separate operation of one unit. According to the present invention, I provide means whereby the length of time required to operate either ram unit is substantially the same as the length of time required to operate both together. Briefly, the present invention contemplates installing a bleeder valve in the high pressure line and to control the open and closed position of the bleeder valve by the shifting movement of the member 210 so that an amount of oil is diverted from the system when only one ram unit is operated, but when both ram units are operated simultaneously the bleeder valve is closed so as to utilize the full capacity of the pump to raise both units.

As best shown in Figure 7, the upper end of the bleeder valve stem 214 is threaded, the threads being fairly coarse and the corresponding portion of the casing receiving the valve stem 214 being correspondingly threaded. The lower end of the stem 214 is formed as a needle valve, as indicated at 230 and cooperates with a bleeder opening 231 formed in the passage 232 leading from the pump to the high pressure passage 253. Thus, whenever the member 210 is shifted in one direction or the other, the valve stem 214 is raised or lowered, opening or closing the bleed passage 231. The capacity of the bleed is such that when the valve is open, sufficient oil is diverted so that one ram unit may be operated through its full stroke in approximately the same time that both ram units are operated when the valve is closed. To adjust the bleeder valve, the pinion 213 may be raised on the splined upper end of the stem 214 and out of mesh with the grooved section 212 to permit turning the pinion to a new position of adjustment before remounting it on the upper end of the stem 214.

While I have shown and described above the preferred structure in which the principles of the present invention have been incorporated. it is to be understood that my invention is not to be limited to the particular details shown and described above, but that, in fact, widely different means may be employed in the practice of the broader aspects of my invention.

What I claim, therefore, and desire to secure by Letters Patent is:

1. A power lift device for agricultural tractors and the like, comprising a pair of ram units normally separately operable, each having controlling valve means therefor, said two valve means being mounted in juxtaposition and each including a casing and a pair of parts, each pair of parts extending from the casing generally toward the other pair, and means mounted for sliding movement on one part of each pair of parts and movable from a position generally centrally of the other parts of said pairs of parts selectively to a position at either one side or the other of said generally central position, said slidable means in its generally central position being operatively engageable with both of said other parts of said pairs of parts for operating both of said valve means simultaneously so as to operate both of said ram units simultaneously, said slidable means in either of its other positions being engageable with one or the other only of said other parts so as to operate one or the other only of said valve means and one or the other only of said ram units associated therewith.

2. A power lift device for agricultural tractors and the like, comprising a pair of ram units normally separately operable, each having controlling valve means therefor, said two controlling valve means being mounted in juxtaposition and each including a casing and a pair of parts extending therefrom, one part of each pair comprising a shaft and the other part comprising an arm having a notch and movable about the axis of said shaft, a shiftable member slidably mounted on the adjacent ends of said shaft parts and shiftable thereon from a position generally centrally between said arms into a position adjacent one or the other of said arms and away from said other or said one arm, respectively, movement of each of said arms controlling the associated valve means, and means on said shiftable member adapted to engage the notches of both of said arms when said shiftable member is in a central position, and the notch of one or the other of said arms when said shiftable member is in one or the other of its lateral positions, for operating only one or the other of said valve means and hence only one or the other of the associated ram units.

3. A power lift device for agricultural tractors and the like, comprising a pair of ram units normally separately operable, each having controlling valve means therefor, said two controlling valve means being mounted in juxtaposition and each including a casing and a pair of parts, each pair of parts comprising an outer tubular shaft and an inner central shaft extending outwardly from the end of said tubular shaft, with the inner shafts extending toward one another, arms on the ends of said tubular shafts, and a member shiftably mounted on the extended ends of said inner shafts and shiftable from a generally central position engaging both of said arms to either one or the other of two lateral positions engaging one or the other only of said arms, said valve means being respectively operable by movement of said arms.

4. Control mechanism for power actuated apparatus including two juxtaposed members and two follow-up mechanisms, each comprising a part operatively connected with the associated juxtaposed member, said control mechanism comprising a member mounted for movement from an intermediate position generally centrally between said juxtaposed member into either of two other positions adjacent one or the other of said juxtaposed members, means adjustably mounted on said movable member and disposed to engage both of said parts when the movable member is in its intermediate position and to be disconnected from one part and engage the other part when said movable member is shifted to either of said other positions, and means for adjusting the position of said last mentioned means on said movable member whereby with one adjustment the point of operation of both of said juxtaposed members may be determined.

5. Control mechanism for a hydraulic unit comprising a pair of housings disposed in side by side relation, each having a pair of concentric shafts extending outwardly of the housings from the adjacent walls thereof, the inner shaft of each pair extending outwardly beyond the outer shaft, an operating arm on the end of each outer shaft, a control arm on each inner shaft adjacent the associated operating arm, and a control lever mounted for rocking movement on the adjacent ends of said inner shafts and having parts engageable with said control and operating arms.

6. Control mechanism for a hydraulic unit comprising a pair of housings disposed in side by side relation, each having a pair of concentric shafts extending outwardly of the housings from the adjacent walls thereof, the inner shaft of each pair extending outwardly beyond the outer shaft, an operating arm on the end of each outer shaft, a control arm on each inner shaft adjacent the associated operating arm, a control lever mounted for rocking movement about the axes of said inner shafts, means on the control lever optionally engageable with said operating arms, and a part adjustable on said lever and optionally engageable by said control arms.

7. A power lift device for agricultural tractors and the like, comprising a pair of ram units normally separately operable, each having controlling valve means therefor, said two controlling valve means being mounted in juxtapositioned and each including a casing and a pair of parts, each pair of parts extending from the associated casing toward the other pair, a shiftable member mounted on one part of each pair of juxtaposed parts and shiftable thereon from a position engaging the other parts of said pairs of parts for operating both of said valve means and both of said ram units simultaneously optionally to either of two positions engaging only one or the other of said other parts, but not both, for operating only one or the other of said valve means, a return linkage operatively connected between each ram unit and the associated valve part on which said shiftable member is mounted, and means on each of said last mentioned valve parts outside the associated casing adapted to act against said shiftable member for returning it to a neutral position.

THEOPHILUS BROWN.

REFERENCES CITED

The following references are of record in the file of this patent:

UNITED STATES PATENTS

| Number | Name | Date |
|---|---|---|
| 2,265,260 | Argo | Dec. 9, 1941 |
| 1,911,737 | Allen | May 30, 1933 |
| 842,961 | Kewley | Feb. 5, 1907 |
| 2,107,760 | McCormick | Feb. 8, 1938 |
| 2,114,157 | Towson | Apr. 12, 1938 |
| 2,337,637 | Brown | Dec. 28, 1943 |
| 2,103,530 | Henry | Dec. 28, 1937 |
| 2,331,790 | Nichols | Oct. 12, 1943 |
| 2,311,516 | Brown et al. | Feb. 16, 1943 |
| 2,347,368 | Rosen | Apr. 25, 1944 |
| 2,336,955 | Ott | Dec. 14, 1933 |
| 2,221,813 | Paulsen | Nov. 19, 1940 |
| 2,403,422 | Worthington | July 2, 1946 |
| 1,271,595 | Matz | July 9, 1918 |

FOREIGN PATENTS

| Number | Country | Date |
|---|---|---|
| 308,099 | German | Sept. 30, 1918 |